LIGHT-SCANNED TUBE AND TARGET THEREFOR

Filed Dec. 12, 1961

INVENTOR
CHARLES D. ROBBINS
BY
AGENT

United States Patent Office 3,283,159
Patented Nov. 1, 1966

3,283,159
LIGHT-SCANNED TUBE AND TARGET THEREFOR
Charles D. Robbins, Stamford, Conn., assignor to Machlett Laboratories, Incorporated, Springdale, Conn., a corporation of Connecticut
Filed Dec. 12, 1961, Ser. No. 158,841
3 Claims. (Cl. 250—213)

Figure 1:
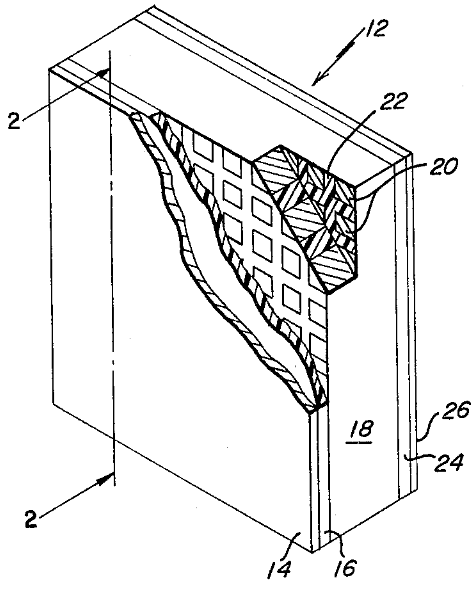

This invention relates generally to light-scanned devices and more specifically to light-scanned image orthicon, infra-red detectors, X-ray image intensifiers, or the like.

My device has particular utility in devices generally referred to as light-scanned tubes wherein the target is read or scanned by a moving beam of light. It is a well known fact that a light-scanned tube gives a significant improvement in low-light level detection when compared with other types of scanned devices.

The improvement achieved by low-light level light-scanned devices results from the elimination of certain effects when can best be explained when compared, for example, with an image orthicon tube which represents the typical electron scanned device.

An image orthicon is a camera tube featuring a scanning beam of electrons which is caused to impinge on a target. Incremental areas of the target are charged in accordance with the signal information, or scene, previously placed thereon and the return beam, modified by the charged target, represents the signal current which is then suitably amplified by an electron multiplier. As with any electron discharge device, an image orthicon is subject to noise which manifests itself as a noise current. This noise current sets the lowest limit of power level necessary for effective operation.

It will then be seen that, while the signal current is determined by the number of signal photoelectrons or charge per target element per target frame time, the noise current is determined by at least four factors. The first of these factors is due to the shot and the partition noises generated in the tube's image section. The second of these factors is due to target Johnson noise, that is, background noise due to thermal agitation in the target. The third factor is the shot noise caused by the fluctuation in the number of scanning beam electrons while the fourth factor is the noise generated in the output multiplier by the reading beam which is, for the image orthicon, the difference between the scanning beam current and the signal current. Thus, if the scanning beam were eliminated, a substantial amount of noise would also be eliminated.

The outstanding characteristic of a light-scanned tube (L-ST), and that characteristic which distinguishes it from electron scanned devices resides in the fact that its reading function is performed by means of a moving light beam instead of the scanning electron beam.

The L-ST circumvents some of the major disadvantages usually encountered in electron beam read-out devices in that it yields a signal proportional to the charge on each element of the mosaic target. Thus, at low signal levels, the theoretical noise contained in the output signal will not contain the shot noise associated with the electron scanning beam since no electron scanning beam is present to generate noise. A further noise reduction comes about in eliminating noise due to that portion of the electron scanning beam which is not effective in producing a signal but, instead, produces a constant background noise.

Unlike the conventional image orthicon, my L-ST has no image section or storage target per se and, instead of the usual electron gun, my reading function is performed by means of a light beam such as that produced by a flying spot scanner.

The front section of my device has a thin layer of front photo-conductive material on which the incident photons are projected. Immediately adjacent this photo-conductive layer is a plurality of wires, the ends of which terminate at the photo-conductive layer. At the other end of the wires is another thin layer of photo-coductive material which I shall refer to as the rear photo-conductive layer. Over each of the exposed portions of the photo-conductive layers are respective electro-conductive layers with a suitable potential applied thereto. A flying spot scanner, such as that formed by a bright kinescope displaying a TV type raster, as well as an associated optical system, is used to focus the raster on the thin rear photo-conductive layer of the target.

The incident photons from a viewed scene are projected on to the front photo-conductive layer. This photo-conductive layer is said to break down, or change to a low impedance, in areas corresponding to the incident photons projected thereon. This causes the potential applied to the front electro-conductive layer to be applied to the front end of the wire adjacent the low impedance portion of the photo-conductive light. As the light from the flying spot scanner traverses across the rear of the target, incremental areas on which the flying spot is focused will also break down or produce a lower impedance. Thus, when the flying spot traverses the rear end of a wire which has high potential placed at the front end thereof due to the presence of a low impedance area brought about by the viewed scene, a relatively high output may be derived from the target which will correspond in all respects to the viewed scene. This output may then be detected in any one of the well-known manners to produce an output which represents an amplified representation of the viewed scene.

At this point, it should be pointed out that it is important that there be no light from the scanning beam allowed to leak through the target structure. This, then, eliminates the possibility of the scanning beam producing false signals by exciting both the front and rear photo-conductive layers. It is, therefore, an object of the present invention to provide a discharge device noted by its low internal noise level.

Another object of the instant invention is to provide a target for a light-scanned tube which is opaque to light.

Still another object of the instant invention is to provide a target that is easily manufactured, yet readily and consistently reproduced.

Figure 2:
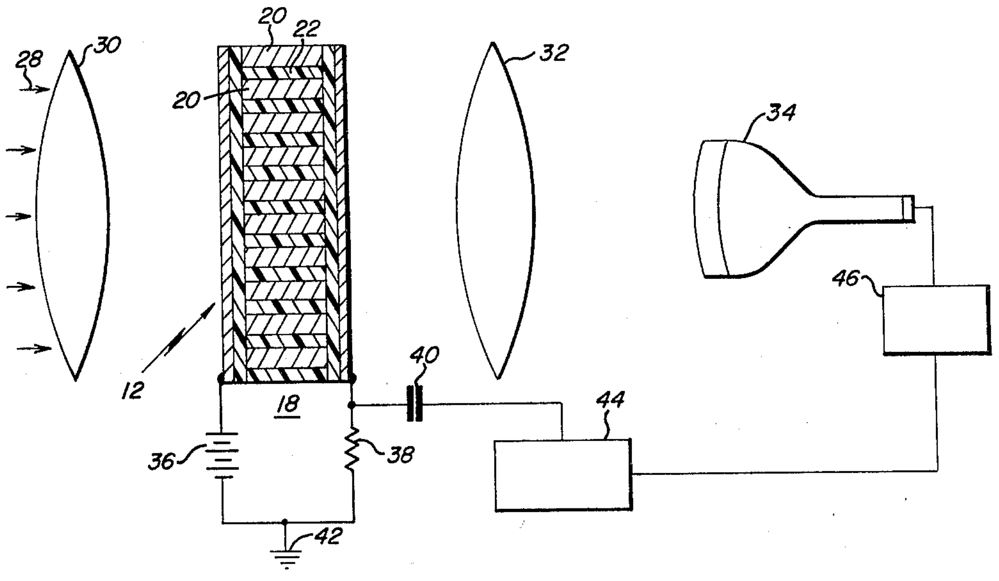

The features of my invention, which I believe to be novel, are set forth with particularity in the appended claims. My invention itself, however, both as to its organization and method of operation, together with further objects and advantages thereof, my be best understood by reference to the following description, taken in conjunction with the accompanying drawing in which:

FIG. 1 depicts, partially in section, the target of my device greatly exaggerated to show the details, and FIG. 2 represents the system utilizing the target of FIG. 1 taken through lines 2—2.

Referring now to FIG. 1, target 12 is shown as being comprised of matrix 18, which comprises wires 20 surrounded by insulation 22. Wires 20 are preferrably low resistance-high conductivity wires such as silver or aluminum which has, for example, been anodized to provide insulation between adjacent wires. Copper may also be used, provided it has ben fluoridized to provide the insulation 22. The important feature is that these wires are parallel to each other and are provided with a uniform layer of insulation. While wires 20 have been shown as being of square cross section, it will be obvious that other configurations may be used, such as rectangular or polygonal, provided the insulation between the wires is of uniform thickness and no light is allowed to leak through from one end of the wires to the other.

Adjacent one end of the wires (which will be referred to as the front end), there is a contiguous layer of photo-conductive material 16 with an electro-conductive layer 14 placed thereover. At the other end of the wires which make up matrix 18, is a contiguous layer of photo-conductive material 24, having a layer of electro-conductive material 26 placed thereover.

Layers 16 and 24 do not have to be the same material. It will be obvious to those skilled in the art that layer 16 may be made to be sensitive to the infrared portion of the spectrum, while layer 24 may be made sensitive to ultra-violet or any other portion of the spectrum. The only requirement for these layers is that they be thin and that the sensitivity must suit the application. For example, I have found that when wires, each having a diameter of about 0.002 inch, are utilized in the matrix 18, the photo-conductive layers may be thinner than, but no thicker than, the thickness of the wires. As will be explained hereinafter, layer 16 should preferably be a material having a relatively slow decay rate, while the material of layer 24 should be relatively insensitive; that is, have a fast decay rate.

In this connection, I have found that when dealing with radiation in the infrared portion of the spectrum, layer 16 will perform well when it is gold-doped germanium. Where layer 16 will be subject to visible light, I have found that antimony trisulfide, antimony oxysulfide, and thin selenium layers work very well. In instances where layer 16 is exposed to X-rays, I have found that somewhat thicker layers of selenium proved satisfactory.

Layer 24 is made relatively insensitive and, since it will be, in most cases, subjected to visible radiation, that is, the light from a flying spot scanner, it may be either antimony trisulfide, antimony oxysulfide, or selenium that has been rendered relatively insensitive. The important considerations regarding layer 24 are that it have a relatively short persistence or lag and that its decay rate be just one bit faster than the decay rate of the phosphor on the flying spot scanner.

Layers 14 and 26 may be composed of films of aluminum, copper, chrome, gold, or, in the case of X-rays, may be a beryllium window.

The important features of layers 14 and 26 are that they be transparent to the radiation that they will pass and that they will have a high conductivity. That is, beryllium windows should be used as layer 14 when my device is used as an X-ray image amplifier. The other important considerations are that the layers provide a uniform distribution of current throughout the conductive surface and that they have a relatively low ohmic resistance.

Referring now to FIG. 2, I have depicted a system for use as either an image orthicon, an infrared detector, or an X-ray image intensifier or amplifier. Target 12 of FIG. 1, having alternate wires 20 and insulation 22, the ends of which are covered by photo-conductive layers 16 and 24 and electro-conductive layers 14 and 26, is interposed between lenses 30 and 32. Incident radiation, depicted by arrows 28, is focused by lens 30, through layer 14, onto photo-conductive layer 16. Lens 32 focuses the light from flying spot scanner 34, through layer 26, onto photo-conductive layer 24 on the rear of the matrix 18. Potential source 36 is connected between electro-conductive layer 14 and a point of ground potential 42. Load resistor 38 is connected between electro-conductive layer 26 and the common point of ground potential 42. Coupling condenser 40 is used to couple the signal appearing across resister 38 to a utilization circuit 44, while 46 provides the necessary synchronization for both flying spot scanner 34 and utilization circuit 44.

*Mode of operation*

Referring now to FIG. 2 for the mode of operation of my device, it will be seen that the incident radiation depicted by arrows 28 is focused by lens 30 onto layer 16. At any selected area where there is sufficient light, layer 16 will break down, become conductive, and apply the potential of sourse 36 to the front end of the wire immediately under the selected area. Simultaneously, the flying spot emanating from the phosphor surface of scanner 34 is focused on layer 24 by lens 32. Since this spot is moving in such a manner as to define a TV type raster, as the spot traverses that portion of photo-conductive layer 24 corresponding to the portion of layer 16 that has been broken down, at that instant it completes the circuit between source 36 and load resistor 38, producing a voltage drop thereacross in the form of a pulse, which is coupled through capacitor 40 to an appropriate utilization circuit 44.

While I have described what is presently considered a preferred embodiment of my invention, it will be obvious to those skilled in the art that various changes and modifications may be made therein without departing from the inventive concept contained therein, and it is, therefore, aimed in the appended claims to cover all such changes and modifications as fall within the true spirit and scope of my invention.

What I claim is:

1. A light-scanned image conversion device comprising in combination, a target comprising first and second imperforate photoconductive layers, a plurality of closely spaced parallel discrete conductive members having their respective ends contiguous with one side of the respective layers, said members being insulated from one another, the entire target between the photoconductive layers being completely opaque to incident light, first and second conductive coatings covering the other side of the respective layers, a source of potential connected between the conductive coatings, means scanning one of the photoconductive layers and means detecting an output from the scanned layer in accordance with information projected on the other photoconductive layer.

2. A light-scanned image conversion device as set forth in claim 1 wherein said members are metal wires having anodized surfaces which provide insulation therebetween.

3. A light-scanned image conversion device as set forth in claim 1 wherein said members are metal wires having fluoridized surfaces which provide insulation therebetween.

References Cited by the Examiner

UNITED STATES PATENTS

| | | | |
|---|---|---|---|
| 1,880,289 | 10/1932 | Sukumlyn | 178—7.1 |
| 2,732,469 | 1/1956 | Palmer | 313—65.1 |
| 2,866,182 | 12/1958 | Mash | 250—43 X |
| 2,944,155 | 7/1960 | Mayer | 313—65.1 |
| 3,107,303 | 10/1963 | Berkowitz | 250—213 |
| 3,152,222 | 10/1964 | Loebner | 178—5.4 |

HERMAN KARL SAALBACH, *Primary Examiner.*

A. GAUSS, S. CHATMON, JR., *Assistant Examiners.*